United States Patent
Distefano et al.

(10) Patent No.: US 6,396,611 B1
(45) Date of Patent: May 28, 2002

(54) MODULAR OPTICAL NETWORK UNITS AND MOUNTING ARRANGEMENT

(75) Inventors: Michael I. Distefano, Freehold Township, Monmouth County; Thomas A. Halliday, Ocean Township, Monmouth County; Frank J. Peragine, Fair Haven Township, Monmouth County, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/049,374

(22) Filed: Mar. 27, 1998

(51) Int. Cl.[7] ............................................. H04B 10/00
(52) U.S. Cl. ................................................. 359/163
(58) Field of Search ................... 359/163, 118, 359/137, 120

(56) References Cited

U.S. PATENT DOCUMENTS

| | | | | |
|---|---|---|---|---|
| 4,738,632 A | * | 4/1988 | Schmidt et al. | 439/341 |
| 5,267,122 A | * | 11/1993 | Glover et al. | 361/704 |
| 5,301,057 A | * | 4/1994 | Eames | 359/163 |
| 5,594,576 A | * | 1/1997 | Sutherland et al. | 359/118 |

* cited by examiner

Primary Examiner—Leslie Pascal
Assistant Examiner—Dalzid Singh
(74) Attorney, Agent, or Firm—John A. Caccuro (57) ABSTRACT

A common Modular Carrier (MC) unit shares power and control among a plurality of Optical Network Units (ONU) which are plugged into it, thereby increasing the ONU density in an existing equipment shelf. In one embodiment, the MC unit together with its four ONU units is arranged to slide into an existing card slot of the existing equipment shelf and occupy the space of the adjacent slot. The result is a doubling of the capacity over the conventional technique of using a separate slot for each ONU unit.

22 Claims, 7 Drawing Sheets

MODULAR OPTICAL NETWORK UNITS AND MOUNTING ARRANGEMENT

TECHNICAL FIELD OF THE INVENTION

This invention relates to optical communication systems and, more particularly, to a system arrangement for mounting modular optical network units.

BACKGROUND OF THE INVENTION

Dense Wavelength Division Multiplex (DWDM) optical transmission systems have been typically is employed to increase the capacity of optical fibers as the traffic load on the system increases. Usually, these systems tend to be high capacity, high bit-rate per channel systems such as long haul telephony. Presently many fiber facilities are at or near exhaustion due to increasing traffic, much of which has been generated by new services, but the application of DWDM technology to these systems will increase the fiber capacity many times over.

Another DWDM application, in what tends to be of shorter length and have much lower bit-rate per channel applications, is in local optical networking. In this application, the systems evolve from a low first cost (and capacity) and have low incremental cost as the traffic capacity grows or changes. Examples of such systems include local cable television distribution systems and collegiate or corporate campus data networks. In these systems, a cable TV company providing Internet access to customers would add channels, for example, as different neighborhoods start to receive service. Also, at a point in the future, the provider would have to increase the transmission capacity to a given neighborhood as the popularity of the service grew. Such typically non-telephony type networks as these require small, compact size terminals, ease of use, and low cost.

In many of the above applications, the space for housing such equipment is limited and existing shelf hardware designs (including all mounting hardware, card guides, and backplanes) can not be easily and economically made to physically accommodate modular capacity growth. As a result, changes in capacity often resulted in expensive shelf redesigns, rearrangements, and unfortunately, in some cases, even service interruptions.

SUMMARY OF THE INVENTION

The optical communication apparatus of the present invention is directed to solving the prior art problems using a Modular Carrier (MC) unit which shares power and control among a plurality of Optical Network Units (ONU) which are plugged into it, thereby increasing the ONU density in an existing equipment shelf. In one embodiment, the MC unit together with its four ONU units is arranged to slide into an existing card slot of the existing equipment shelf and occupy the space of the adjacent slot. The result is a doubling of the capacity over the conventional technique of using a separate slot for each ONU unit.

More particularly, our optical apparatus comprises a common Module Carrier (MC) unit including a power unit, a board controller, and an equipment detector unit for detecting an electrical ONU present signal indicative of the connection of an ONU, the board controller being responsive to the ONU present signal for (1) signaling the power unit to apply power to the connected ONU and (2) for sending control signals to connected ONU. An interface unit includes a connectorized backplane card connected to receive power and control signals from the MC unit, couples a plurality of ONU present signals to the MC unit, and is arranged for mounting each of the plurality of ONU in a separate connector slot of the connectorized backplane card. One or more ONUs may be plugged into the interface unit, each ONU is adapted for mounting into a separate connector slot to connect to the backplane card and arranged to receive the power and control signals from the MC unit, is adapted to generate the ONU present signal, and is adapted to couple optical signals into and out of the ONU. In accordance with the present invention, the ONU may be an Optical Translator Module(OTPM), optical regenerator, optical multiplexer, optical demultiplexer, optical monitor, etc.

According to another aspect of the invention, an ONU unit is adapted to mount into a separate connector slot of a MC unit and comprises circuitry for providing an ONU present signals indicative of the mounting of the ONU in a connector slot of the MC unit, circuitry for receiving power and control signals from the MC unit, and a power filter for controlling the rate at which power is applied to the ONU.

DETAILED DESCRIPTION

In the following description, each item or block of each figure has a reference designation associated therewith, the first number of which refers to the figure in which that item is first located (e.g., 401 is located in FIG. 4).

While the present invention will be described as using OPTMs, one particular type of ONU, it should be understood that other types of circuits including optical regenerators, optical multiplexers, optical demultiplexers, optical monitors, etc could be incorporated into the ONU design. In such applications the MC unit is adapted to handle the required power and signals appropriate to that ONU unit. The MC unit reads the identity of the ONU being used from a Programmable Read Only Memory (PROM) device on the ONU.

Figure 1:
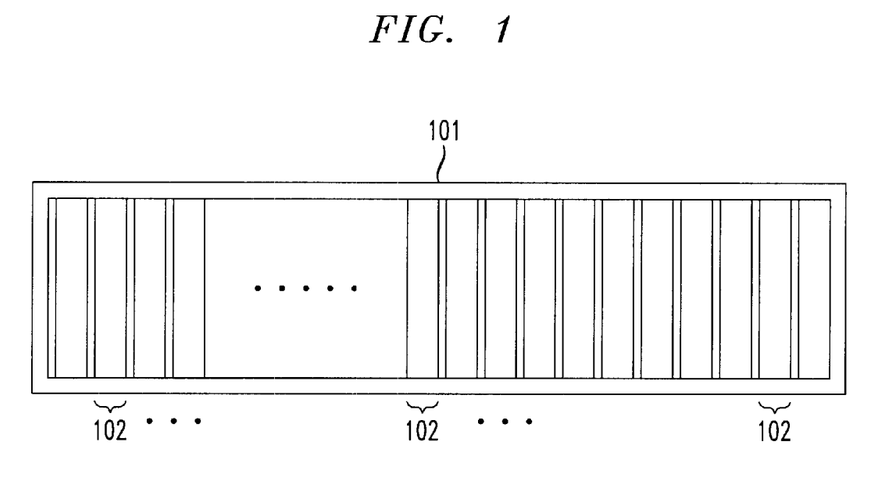
FIG. 1 shows a block diagram of a prior art multiple slot equipment shelf for housing a plurality of Optical Network Units (ONU)

Shown in FIG. 1 is a block diagram of a prior art multiple connector slot equipment shelf 101 for housing a plurality of Optical Network Units (ONUs) 102, such as Optical Translator Modules (OTPMs). As shown each ONU occupies a different slot in the equipment shelf 101 and connects via a separate connector to the backplane of the equipment shelf. Once the shelf 101 is filled, an additional shelf must be added to accommodate any additional ONU(s). However, at some locations the additional shelf space may not be available. Thus, there is a continuing need to be able to increase the ONU packing density.

Figure 2:
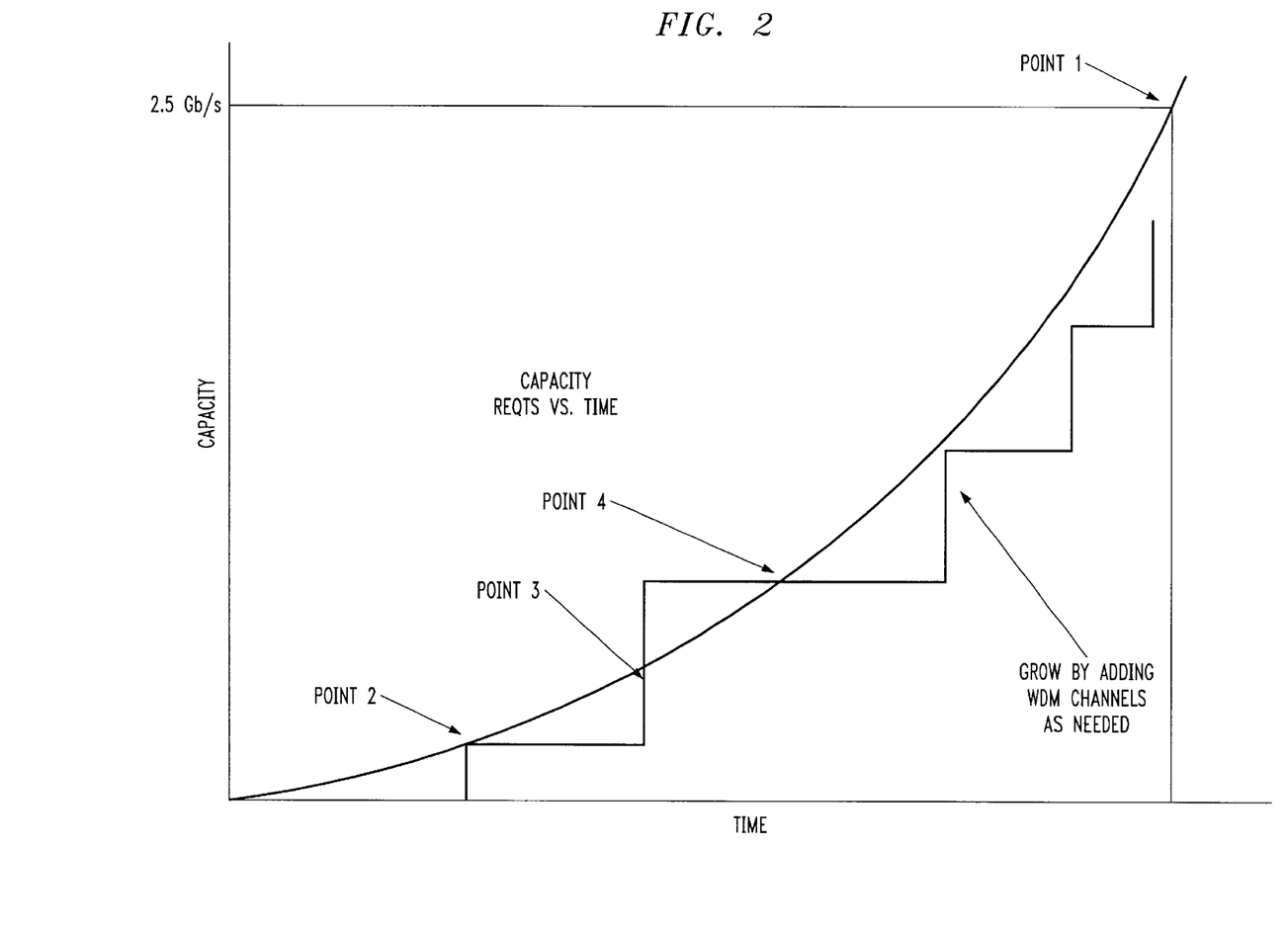
FIG. 2 shows an illustrative system capacity growth versus time diagram.

FIG. 2 shows an illustrative system capacity growth versus time diagram. If a service provider is being called upon to provide additional transmission (e.g., telephony-related traffic) at a Point 1 capacity, on an existing fiber where traffic is not multiplexed and is close to the capacity of the fiber, it is known that by using digital multiplexed signals, such as an OC-48 (2.488 Gb/s) Time Division Multiplex (TDM) system, the additional needed capacity can be provided. If additional capacity was needed then Dense Wave Division Multiplex (DWDM) techniques could be used to further expand the capacity of this fiber many times over. These techniques are commonly used in the first, telephony-related application previously described.

In an illustrative cable TV application, when a cable TV company is making a new offering of cable modem service into an area, a new fiber would be put in service and first service would be offered at Point 2 capacity using, for example, an OC-3 (155.520 Mb/s) channel. At this point in time all of the slots in the equipment shelf 101 may already be occupied. As service demands increase, new channels may be added as depicted, by Points 3 and Point 4. This may be done, for example, when new neighborhoods are added to the service area, as described above. Alternatively, if the first channel installed were at the OC-3 rate, and traffic density increased in the original neighborhood, capacity might be increased to OC-12 (622.08 Mb/s) as at Point 4. In either of these events, if no slots in the equipment shelf 101 are available, it may at best be costly or at worst impossible to add an extra equipment shelf needed to house the additional OTPM(s). Thus what is needed in these local access or optical networking applications are low cost, compact OTPM(s) which can utilize existing shelf space. Additionally, it is a requirement that when a new service is added, or the existing service is upgraded, traffic that is not involved in the service change should not be affected.

Figure 3:
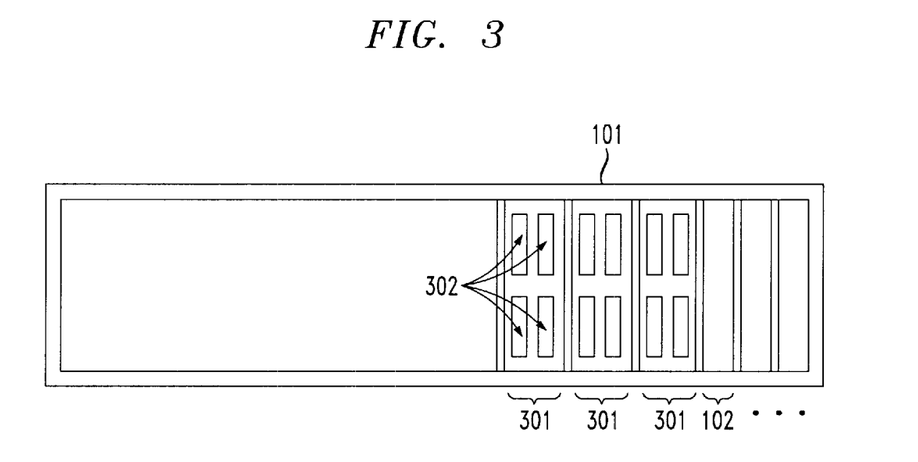
FIG. 3 shows an illustrative multiple slot equipment shelf of FIG. 1 into which three of the optical apparatuses of the present invention are mounted.

FIG. 3 shows an illustrative multiple slot equipment shelf 101 of FIG. 1 into which three optical apparatuses 301 (an MC unit with up to four OTPMs) of the present invention are mounted. Since each optical apparatus includes four OTPMs 302 there is an effective doubling of the packing density. A doubling occurs because while each optical apparatus includes four OTPMs 302, it also occupies the space of two slots 102 (each of which can hold a prior art ONU).

Figure 4:
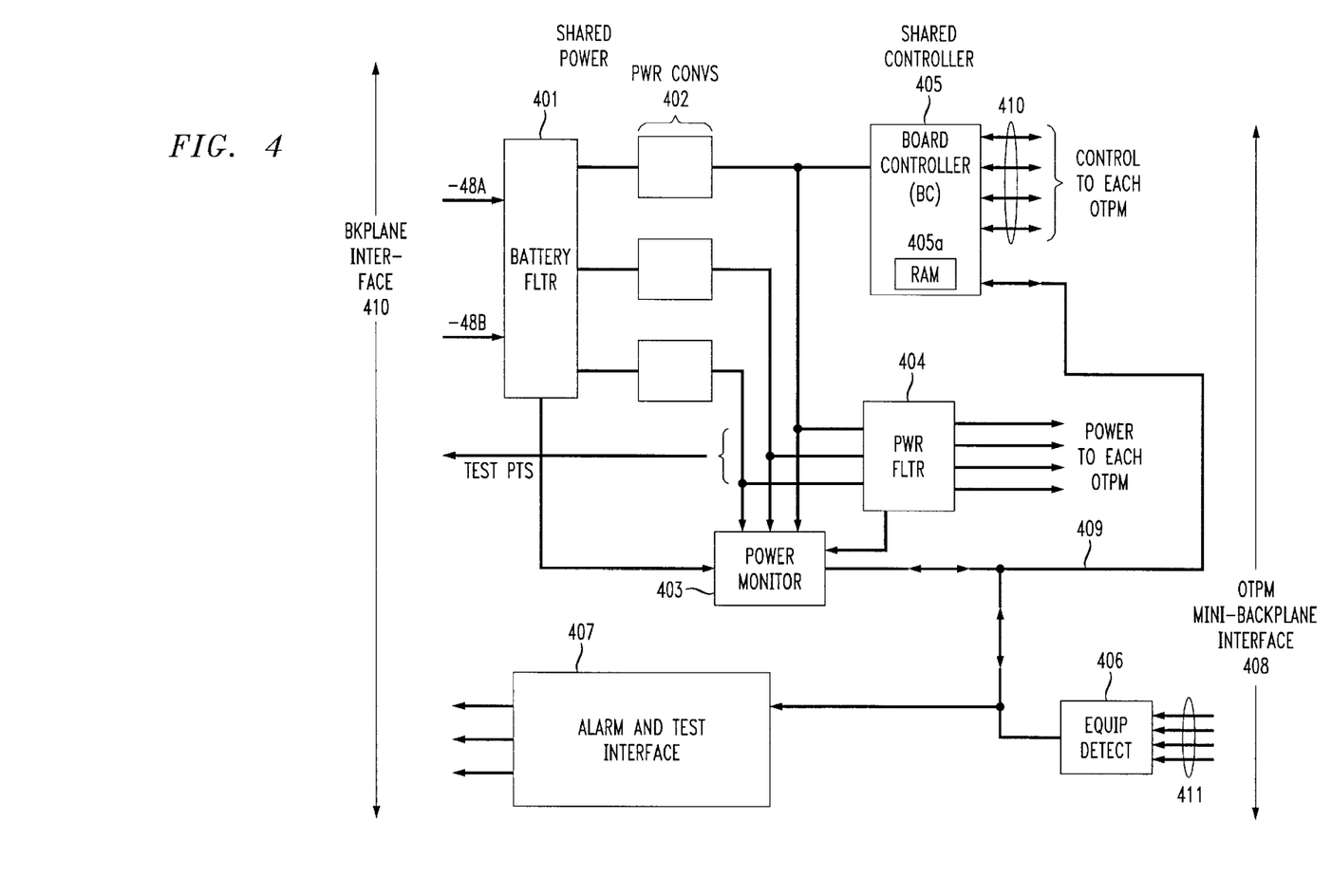
FIG. 4. shows an illustrative block diagram of circuitry located in our common Module Carrier (MC)

With reference to FIG. 4, there is shown a block diagram of a Module Carrier (MC) in accordance with the present invention. As will be discussed, our optical apparatus achieves both the packing density enhancement and uninterruptible service objectives by providing power supply and processor resources on a common plug-in MC circuit pack. The sharing of power supply circuits (battery filter 401, power converters 402, power monitor 403 and power filter 404), board controller (BC) 405 and equipment detector 406 and alarm/test circuit 407 enables the construction of OTPMs having decreased cost, complexity and power consumption. The power monitor 403, in a well known manner, detects fuse status and power levels at filters 401 and 404 and converters 402. The equipment detector 406 detects the present/absence of a ground signal on a predetermined pin of each of the OPTM's connector indicating the presence/absence of that respective OPTM. The alarm/test circuit 407 provides external alarm indications, test data, and control signals from the MC circuit pack. A control and data bus 409 enables the Board Controller (BC) 405 to communicate with the power monitor 403, equipment detector 406, and alarm/test circuit 407. The BC 405 includes Random Access Memory (RAM), 405a, to store data identifying the type of OTPMs and operational data specific to the various OTPM units, which data is obtained from PROMs on the installed OTPMs. The MC circuit pack also utilizes the existing shelf hardware designs (including all mounting hardware, card guides, and backplanes 410). Thus, with brief references to FIG. 6, the MC unit 602 slides into existing shelf card guides, the connector 605 connects to the existing shelf backplane, and latches 620 engage with the existing shelf housing.

Returning to FIG. 4, the sharing of the control and power functions on the MC unit is facilitated by the use of a small backplane 408, called the mini-backplane 408, which interfaces the BC 405 to a connector from each of the four OTPMs. Separate power leads are provided to each of the OPTMs. Additionally, BC 405 communicates over separate signal/control bus 410 to each OTPM, e.g., to control the frequency and amplitude of tones used to modulate the laser signal, to monitor laser bias and temperature, and to control status light-emitting-diodes LEDs.

Figure 6:
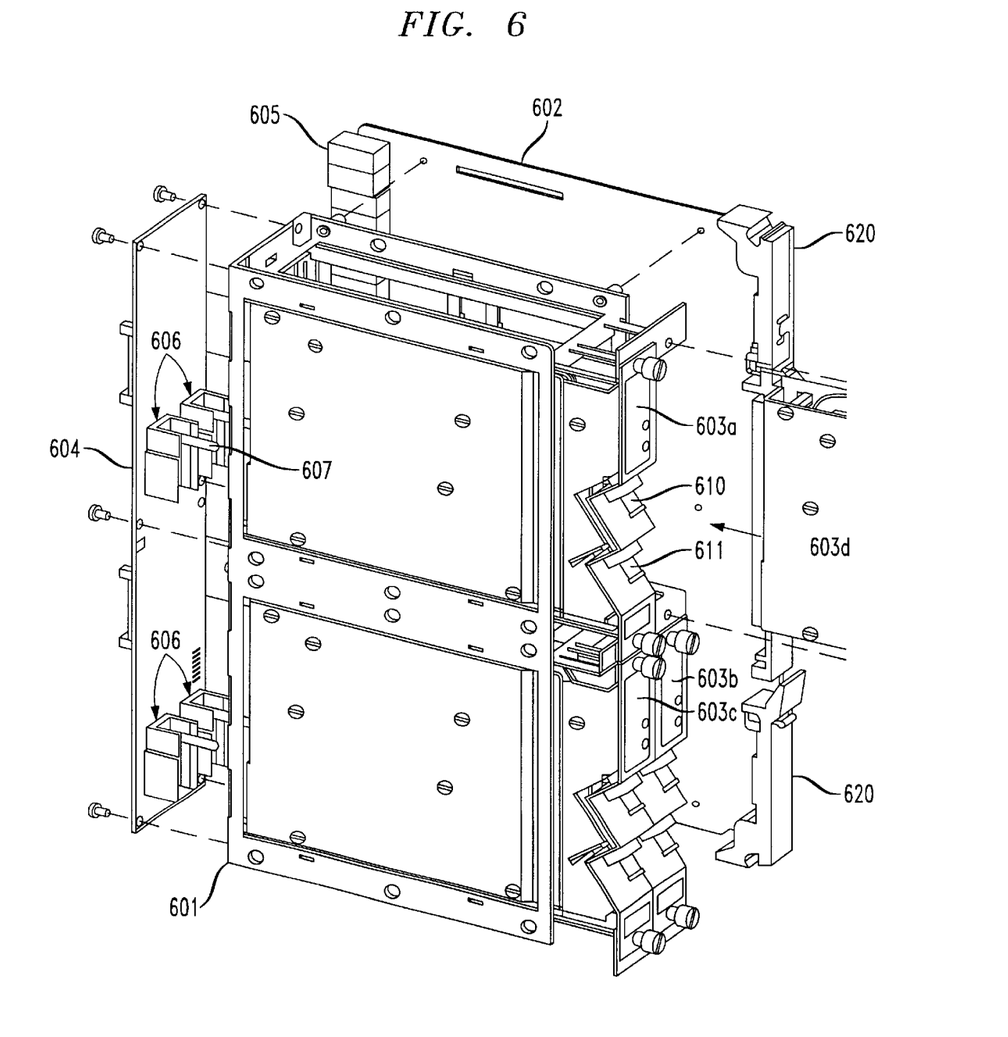
FIGS. 6 and 7 show an illustrative physical housing of an OTPM.

As shown in FIGS. 3 and 6, up to four OTPMs can be plugged into a single MC unit. This MC arrangement with plug-in OTPMs, as described above, results in a doubling of the capacity for the shelf. With reference to FIG. 6, there is shown the four OTPMs 603, three connected 603a, 603b, and 603c, and one, 603d, in the process of being connected into support frame 601. The interface support frame 601 is mounted on the parent board 602 of the MC circuit. The mini-backplane 604 provides the various power and control signal connections between the parent board 602 and the respective connector 606 for each OTPM. As previously noted, the parent board 602 slide into an existing shelf guide and interfaces with the shelf backplane through the connectors 605.

Figure 7:
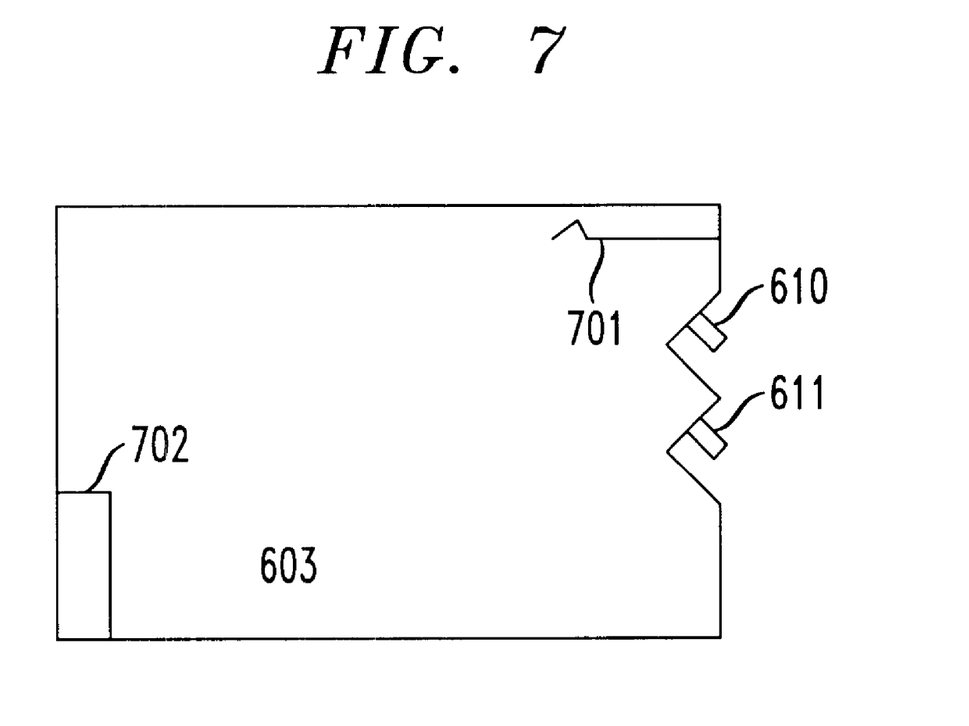

With joint reference to FIGS. 6 and 7, a spring clip 701 mounted on the OPTM 603 is used to contact the interface support frame 601 to provide a building ground to the OTPM as that unit is being inserted to the interface support frame 601. This grounding arrangement discharges any electro-static between the human installer, OTPM card and equipment bay before the OTPM card 603 is connected to the interface support frame 601. Additionally, signal grounding is obtained using a longer ground pin 607 on MC connector 606 which mates with the OTPM connector 702 ground pin prior to the mating of other pins on connectors 606 and 702. While MC connector is shown having the longer ground pin, obviously if desired, the connector 702 can be arranged with the longer pin.

Figure 5:
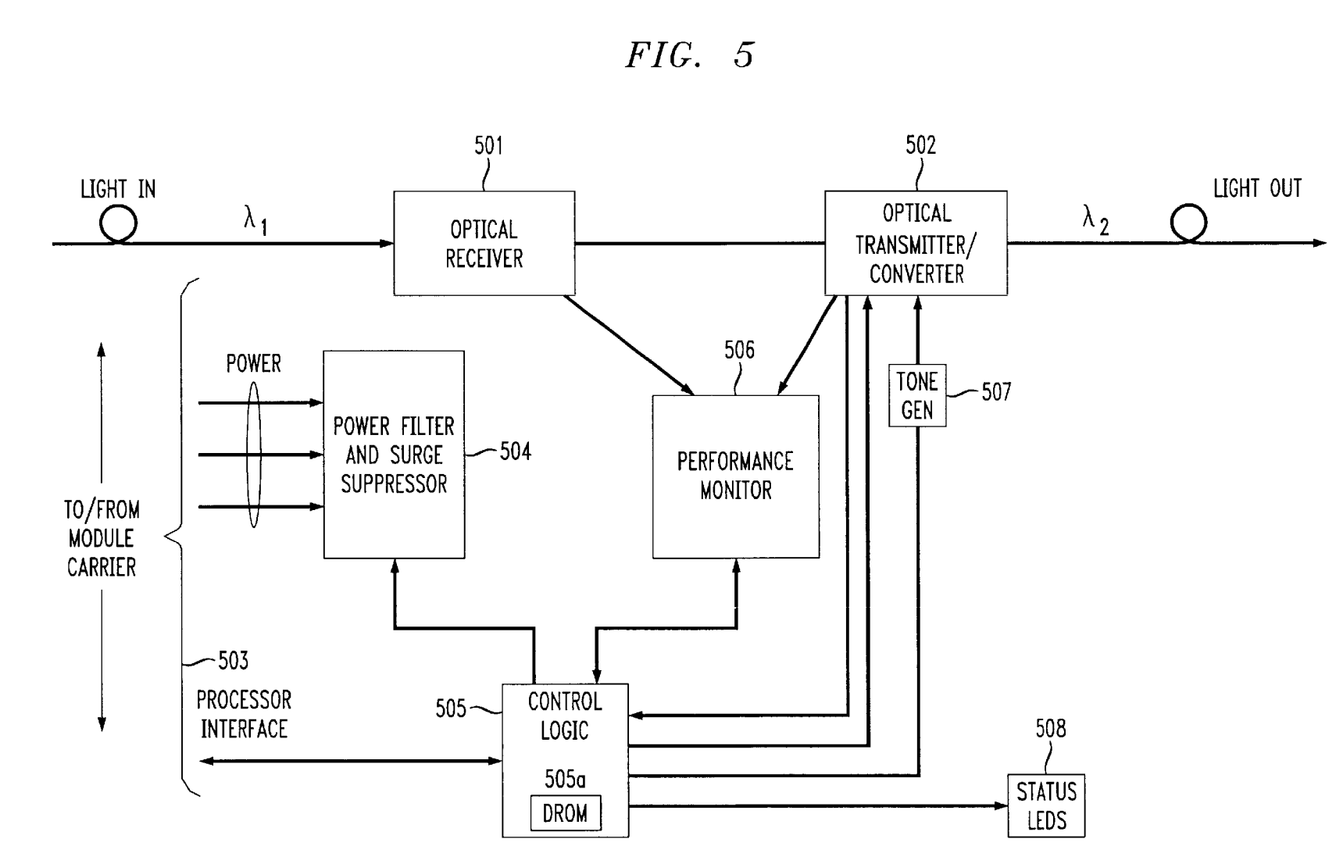
FIG. 5. shows a illustrative block diagram of circuitry located in our Optical Translator Module (OTPM)

FIG. 5. shows a block diagram of circuitry located in the Optical Translator Module (OTPM). All optical and electrical circuitry for one direction of transmission resides on each OTPM. The OTPM plug-in units, include an optical receiver 501 and optical transmitter 502 which are used to carry optical signal channels. As shown in FIG. 6, the optical signals are received via connector 610 and outputted via connector 611. In one optional arrangement, receiver 501 includes clock and data recovery and the OTPMs performs regeneration and performance monitoring functions. Optical signal data entering the receiver 501 may be received at any wavelength, $\lambda_1$, illustratively, at 1310 nm, and converted in the transmitter 502 to any one of, for example, sixteen, possible wavelength channels, e.g., $\lambda_2$, in the 1540 nm to 1560 nm DWDM band. Any combination of wavelengths or bit rates can be equipped in any OTPM.

Each OPTM communicates power and control signals 503 over a connector (606 of FIG. 6). Power filter unit 504 distributes power to the various circuits of the OTPM. Power filter unit 504 includes analog power filter circuits which control the rate at which power is applied to the OTPM. Performance monitor 506 monitors signals such as loss of signal, clock, and signal parity errors. Control and data signals are communicated to control logic 505. Control logic 505 receives signals from performance monitor 506 and also monitors signals such as laser bias, laser temperature, and modulation tone amplitude and frequency. Control logic 505 also compares many of the received status signals to predetermined status signals stored in a PROM device 505a. The PROM 505a also stores information that identifies the type of OTPM that is plugged in. In response to control signals from BC 405 the control logic 505 sends laser on/off signals to control the transmit laser in optical transmitter 502, sets the frequency and amplitude of laser modulation tone from tone generator 507, and controls OTPM status LEDs 508 to indicate failure and in-service conditions.

With joint reference to FIGS. 4, 5, 6 and 7 we describe an illustrative sequence of events when an OTPM is inserted or removed from the MC unit.

The installation sequence is:
1. When an OTPM is partially inserted in to the shelf, with no connector 606 mated, physical contact between the human installer, the OTPM framework, and the equipment bay is made, discharging any electrostatic charge into the bay framework and to building ground. This is accomplished using metal spring clip 701 on OTPM which contacts the MC framework.
2. Additionally, signal ground is provided first using a longer ground pin 607 on MC connector 606 which mates with the ground pin of OTPM connector 702 prior to the mating of other pins on connectors 606 and 702.
3. Then BC 405 determines which OTPM has been inserted by testing for a ground potential on the equipment leads 411.
4. Then BC 405 verifies when an OTPM is inserted and issues a command to power monitor 403 to turn-on the power to the particular OTPM. The power is turned-on at a prescribed rate. Additionally, circuits on the newly inserted OTPM slowly ramp up the power to reduce the in-rush current in order to prevent disturbances to other previously installed OTPMs.
5. Then BC 405 turns on signals to the newly installed OTPM. After an OTPM is installed, firmware at BC 405 reads it's code (to know it's bit rate)and other data from PROM 505a on the OTPM. Circuits on the newly inserted OTPM slowly ramp up to power to reduce the in-rush current in order to prevent disturbances to other previously installed OTPMs. With power established, transmission can be initiated from the newly installed OTPM.

The OTPM removal sequence is:
1. Removal is detected by BC 405 when it detects an "open" condition, e.g., lack of ground signal, on pin 607 from an OTPM, indicating that it has been removed.
2. Then BC 405 determines which specific OTPM is being removed.
3. Then BC 405 turns-off signals to the connector 606 associated with the removed OTPM (control signals only; no transmission signals are turned off).
4. Then BC 405 turns-off power to the connector 606 of the removed OTPM.
5. Lastly, the long ground pin 606 and then the spring clip 701 ground connections are broken as the OTPM is slid out of the interface support frame 601.

What has been described is merely illustrative of the application of the principles of the present invention. Other arrangements and methods can be implemented by those skilled in the art without departing from the spirit and scope of the present invention.

What is claimed is:

1. An optical communication apparatus comprising
    a common Module Carrier (MC) unit including a power unit, a board controller, and an equipment detector unit for detecting an electrical Optical Network Unit (ONU) present signal indicative of the connection of an ONU, the board controller being responsive to the ONU present signal for (1) signaling the power unit to apply power to the connected ONU and (2) for sending control signals to connected ONU,
    an interface unit including a connectorized backplane card connected to receive power and control signals from the MC unit, for coupling a plurality of ONU present signals to the MC unit, and arranged for mounting each of the plurality of ONU in a separate connector slot of the connectorized backplane card, and
    at least one ONU, each ONU connected into a separate connector slot to the backplane card and arranged to receive the power and control signals from the MC unit, to generate the ONU present signal and adapted to couple optical signals into and out of the ONU.

2. The optical communication apparatus comprising of claim 1 wherein the at least one ONU includes a power filter unit for selectively controlling an application of power to itself.

3. The optical communication apparatus comprising of claim 2 wherein the application of power to the at least one ONU is controlled using analog power filter circuits.

4. The optical communication apparatus of claim 1 arranged to plug into a connector slot of a multiple connector slot equipment shelf, and wherein the dimension of the optical communication apparatus is such as to occupy at least two of the connector slots of the equipment shelf.

5. The optical communication apparatus of claim 1 wherein the backplane card of the interface unit is arranged to handle at least four ONUs.

6. The optical communication apparatus of claim 1 wherein the MC unit includes a plug-in circuit card and the backplane card is mounted perpendicular thereon, and wherein at least one ONU includes a plug-in circuit unit which mounts to the backplane card in the same direction that the common unit mounts into its housing.

7. The optical communication apparatus of claim 1 wherein the MC unit selectively controls the application of power to the at least one ONU.

8. The optical communication apparatus of claim 1 wherein the ONU may be any of a type selected from a group including at least an Optical Translator Module (OTPM), an optical regenerator, an optical multiplexer, and an optical demultiplexer.

9. The optical communication apparatus of claim 1 wherein the board controller includes memory having prestored data used by the board controller in controlling the connected at least one ONU.

10. The optical communication apparatus of claim 1 wherein the at least one ONU includes at least one optical connector for coupling signals into or out of the at least one ONU.

11. The optical communication apparatus of claim 1 wherein the at least one ONU is an OPTM including control logic for monitoring and controlling optical signals received by and transmitted from the at least one OPTM.

12. The optical communication apparatus of claim 1 wherein the at least one OPTM includes light emitting diodes for indicating the status of the OTPM.

13. The optical communication apparatus of claim 1 wherein the backplane card includes a connector to which an ONU connector connects when mounted, the ground pins of the backplane and OTPM connectors being arranged to make contact with each other prior to contact being made between any other pins of said connectors.

14. The optical communication apparatus of claim 1 wherein the ONU includes a spring clip for engaging a grounded portion of the interface unit as the ONU is inserted into the interface unit prior to any electrical connection being established between the ONU and the connectorized backplane.

15. An Optical Network Unit (ONU) adapted to mount into a separate slot of a multiple slot Modular Control (MC) unit, the ONU comprising means for providing an ONU present signal indicative of the mounting of the ONU in a connector slot of the MC unit, means for receiving power and control signals from the MC unit , and a power filter for controlling the rate at which power is applied to the ONU.

16. The ONU of claim 15 being of a type selected from a group including at least an Optical Translator Module (OTPM), an optical regenerator, an optical multiplexer, and an optical demultiplexer.

17. The ONU of claim 15 being an Optical Translator Module (OPTM) including control logic for monitoring and controlling optical signals received by and transmitted from the at least one OTPM.

18. The OPTM of claim 17 including one or more light emitting diodes for indicating the status of the OTPM.

19. The OTPM of claim 17 including at least two optical connectors for coupling optical signals into and from the OTPM.

20. The OTPM of claim 17 including control logic for monitoring and controlling optical signals received by and transmitted from the OPTM.

21. The ONU of claim 15 including a connector for connecting with a connector on the MC unit such that a ground connection is established before any other electrical connection between the ONU and the MC unit.

22. The ONU of claim 15 wherein the ONU includes a spring clip for engaging a grounded portion of the MC unit prior to any electrical connection being established between the ONU and the MC unit.

* * * * *